United States Patent [19]

Sheerin

[11] Patent Number: 5,844,333
[45] Date of Patent: Dec. 1, 1998

[54] DEVICE AND METHOD FOR COOLING A MOTOR

[75] Inventor: Geoffrey T. Sheerin, London, Canada

[73] Assignee: Unifin International, Inc., Canada

[21] Appl. No.: 748,165

[22] Filed: Nov. 12, 1996

[51] Int. Cl.[6] .............................. H02K 9/00; H02K 1/32; H02K 5/00; F24B 1/06
[52] U.S. Cl. ............................. 310/52; 310/58; 310/62; 310/64; 310/89; 165/124
[58] Field of Search .................................. 310/52, 58, 59, 310/64, 65, 89, 62, 63; 165/124

[56] References Cited

U.S. PATENT DOCUMENTS

| | | | |
|---|---|---|---|
| 3,652,881 | 3/1972 | Albright et al. | 310/57 |
| 3,714,478 | 1/1973 | DeMania et al. | 310/55 |
| 3,822,389 | 7/1974 | Kudlacik | 310/53 |
| 4,071,791 | 1/1978 | Armor et al. | 310/59 |
| 4,141,669 | 2/1979 | Darby et al. | 408/1 R |
| 4,531,576 | 7/1985 | Kals | 165/108 |
| 4,574,868 | 3/1986 | Anders | 165/144 |
| 4,832,116 | 5/1989 | Easton | 165/126 |
| 4,845,394 | 7/1989 | Kleinhans | 310/64 |
| 5,523,640 | 6/1996 | Sparer et al. | 310/64 |
| 5,613,554 | 3/1997 | Bull et al. | 165/50 |

*Primary Examiner*—Steven L. Stephen
*Assistant Examiner*—Michael J. Wallace, Jr.
*Attorney, Agent, or Firm*—Shook, Hardy & Bacon L.L.P.

[57] ABSTRACT

An air cooler for an enclosed frame motor wherein two air-to-air heat exchangers are located in an enclosure mounted above an opening in the frame. The heat exchangers are disposed so that the heat exchanger coolant tubes extend transversely to the longitudinal axis of the motor drive shaft. The heat exchangers are positioned at opposed ends of the motor and inclined toward one another in an A-shaped configuration. The enclosure forms an enclosed region with the frame, isolating motor air inside the region from ambient air outside the region. An intake plenum is coupled with the enclosure on one side to direct ambient air into the interior of the heat exchanger coolant tubes at one end, whereby the ambient air exits from the tubes at the other end. Motor air surrounding the motor is heated during operation and circulated by an internal fan among the heat exchangers. The motor air is cooled to a substantially uniform temperature and returns on each opposed end of the motor with minimal temperature differential at the ends. The increased number of coolant tubes and their shorter length reduce external pressure drop through the tubes and permit greater efficiency of the fan used to direct ambient air through the interior of the tubes. Utilization of twisted coolant tubes in the heat exchanger, instead of conventional round tubes, can further increase efficiency. Alternatively, a plate-type air-to-air heat exchanger may be employed.

12 Claims, 5 Drawing Sheets

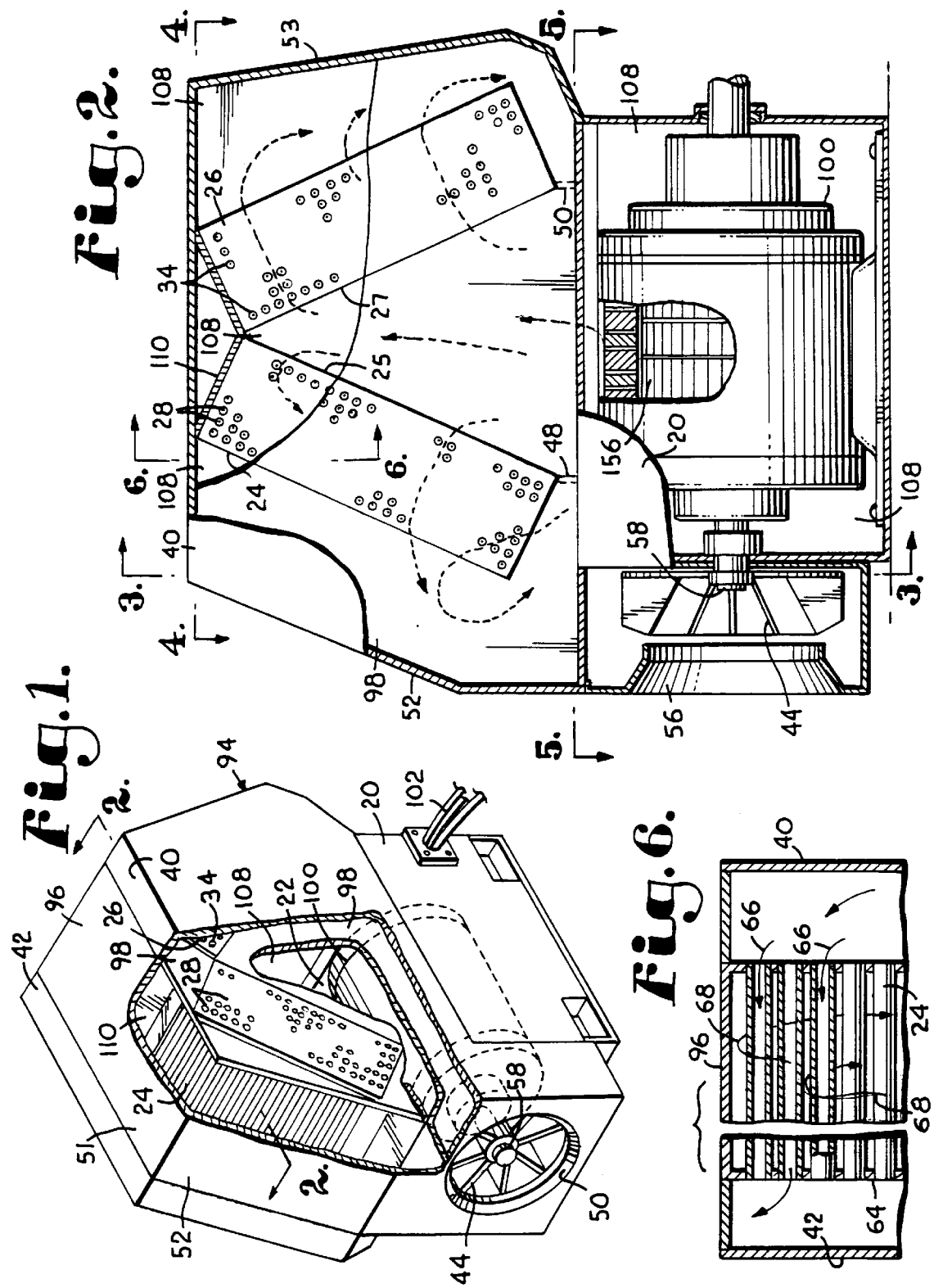

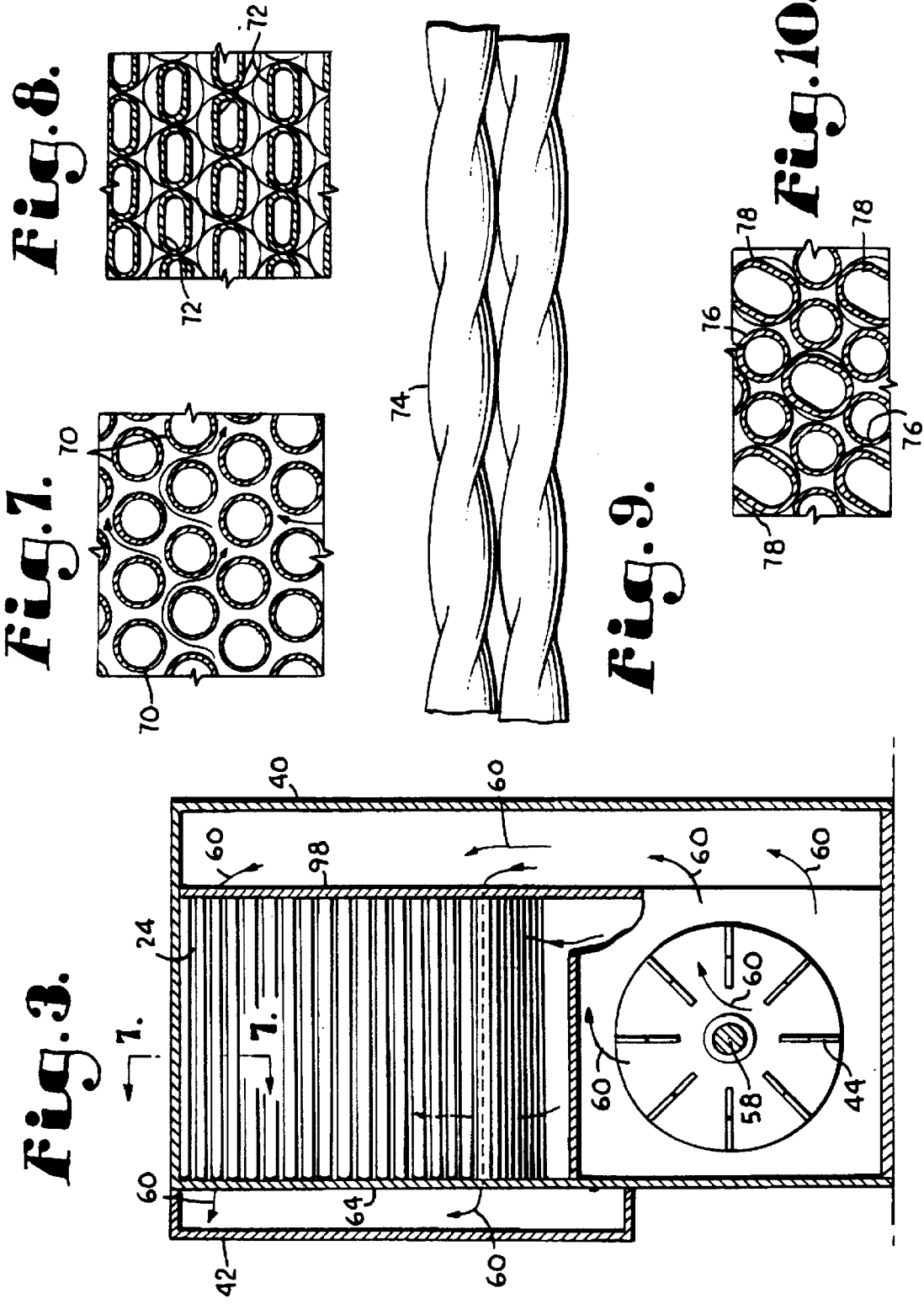

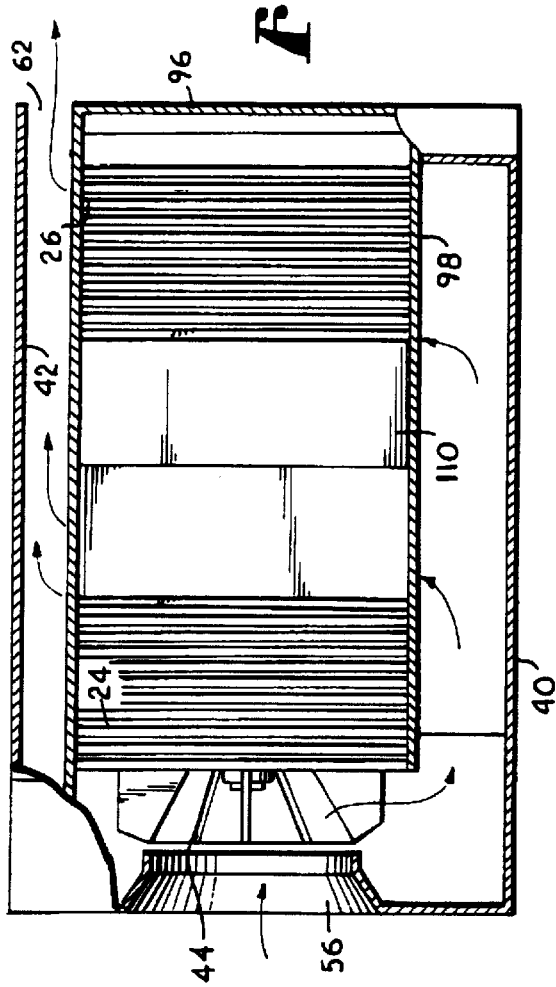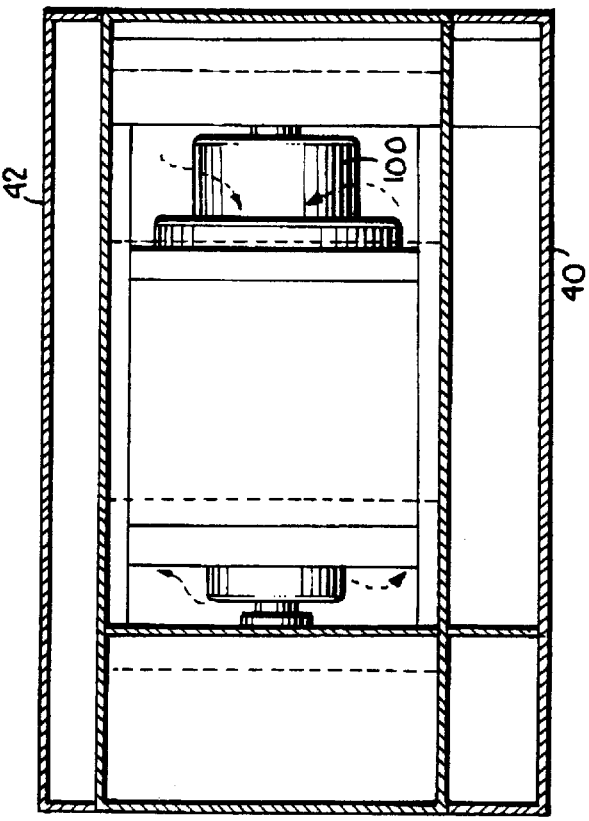

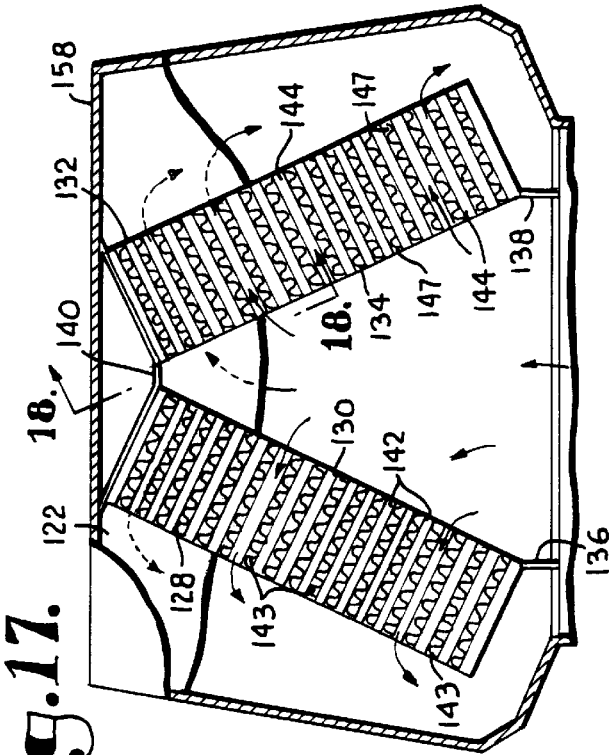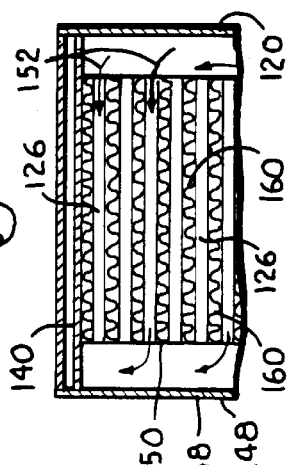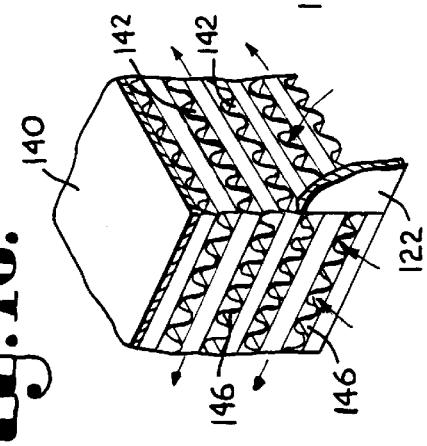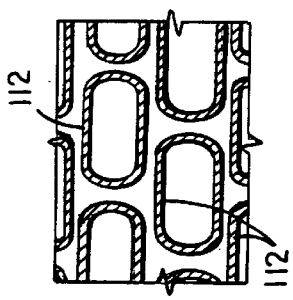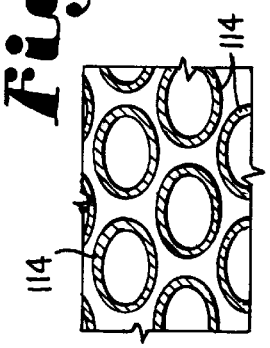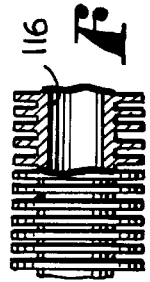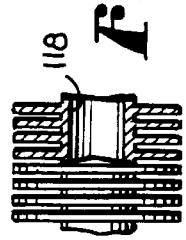

DEVICE AND METHOD FOR COOLING A MOTOR

BACKGROUND OF INVENTION

This invention relates to the field of motor cooling and, more particularly, to an electric motor air cooler using an air-to-air heat exchanger.

Electric motors are used in a variety of settings. Industrial electric motors can have rated power outputs in the thousands of horsepower and can generate substantial heat during operation. If not properly dissipated, the heat can damage the motor and render it inoperable. Electric motors can often be sufficiently cooled by exposure to outside air. In the well-known "open frame" electric motor configuration, air from the surrounding environment circulates around the motor to achieve a usually satisfactory cooling rate.

The open frame configuration is unsuitable for some applications. For example, an electric motor can be required in environments containing explosive gases that could be detonated by a spark from the motor. An electric motor is often employed outdoors where the open frame motor can be undesirably exposed to the elements. The motor might also be operated in a dusty environment where dust could accumulate on the open frame motor causing overheating during operation.

To overcome the limitations of the open frame configuration, an "enclosed frame" configuration can be used. In the enclosed frame configuration, the electric motor is essentially surrounded by a closed frame to shield it from a deleterious substance or condition in the environment. To prevent excessive heat in the enclosed frame during motor operation, a cooling system is required to remove heat while still isolating the motor from the outside environment. The motor frame is typically open on one side to facilitate coupling with the cooling system, which is often mounted in an enclosure over the exposed side, forming an enclosed region about the motor. "Motor air" comprising air contained within the enclosed region is thereby isolated from the outside environment.

Generally, the cooling cycle for such a system begins when the motor air surrounding the motor is heated during operation. An internal fan circulates the heated air within the enclosure and into contact with the external surface of coolant tubes in a heat exchanger located in the enclosure. The heated motor air transfers heat to the heat exchanger, thereby producing cooled motor air. The cooled motor air returns toward the motor, and the cooling cycle repeats.

For such applications, the heat exchanger is typically either liquid-cooled or air-cooled. In the liquid-cooled heat exchanger, also known in this context as a "liquid-to-air" heat exchanger, a coolant liquid is circulated through the interior of the coolant tubes to facilitate transfer of heat from the heated motor air to the external environment. The air-cooled heat exchanger, also known in this context as an "air-to-air" heat exchanger, works on the same principle except that, instead of a liquid, "ambient air" comprising air from outside the enclosed region circulates through the interior of the heat exchanger coolant tubes. Liquid-cooled heat exchangers have achieved satisfactory results comparable to the cooling rate of the open frame configuration. However, electric motor operation can occur in locations where a liquid-cooled heat exchanger is not desirable or convenient. For example, in desert environments, difficulties can arise in obtaining an adequate coolant liquid source. In other environments, problems of liquid coolant freezing and leaking can arise.

The air-to-air heat exchanger normally provides less cooling capacity than its liquid-to-air counterpart. In the conventional configuration, the air-to-air heat exchanger coolant tubes run above, and substantially parallel to, the motor drive shaft from one end of the cooling system enclosure to the other. A plenum is mounted on the enclosure at one end to channel a stream of ambient air, usually generated by a fan, into the interior of the coolant tubes at the ambient air intake end of the heat exchanger. The ambient air travels through the interior of the tubes without contacting the motor air within the enclosed region and exits at the exhaust end of the coolant tubes opposite the intake end.

Motor air is heated during motor operation. An internal fan circulates the motor air within the enclosure and into contact with the midsection of the coolant tubes of the heat exchanger. As it contacts the outside surface of the coolant tubes, the heated motor air transfers heat to the coolant tubes, which in turn transfer the heat to the ambient air flowing therein. The thereby cooled motor air then circulates among the heat exchanger coolant tubes at either the intake end or the exhaust end of the heat exchanger and back to the motor, wherein the cycle repeats, thereby cooling the motor.

As will be appreciated by those skilled in the art, this configuration produces two motor air currents circulating in opposite directions. A first current flows about the forward half section of the heat exchanger near the ambient air intake. This first current circulates upwardly among the midsection of the heat exchanger coolant tubes and then downwardly among the heat exchanger coolant tubes at the ambient air intake end of the heat exchanger. A second current flows about the rear half section of the heat exchanger near the ambient air exhaust. The second current likewise circulates upwardly among the midsection of the heat exchanger coolant tubes but then circulates downwardly among the heat exchanger coolant tubes at the ambient air exhaust end of the heat exchanger.

This air-to-air heat exchanger configuration is inefficient. The ambient air in the coolant tubes grows warmer as it flows through the interior of the coolant tubes from the intake end to the exhaust end of the heat exchanger. Since the first internal current flows among the warmed midsection of the coolant tubes and then among the cooler intake end of the coolant tubes, it is said to be flowing "counter-current" with the ambient air stream. Since the rear current flows among the warmed midsection of the coolant tubes and then among the warmer exhaust end of the coolant tubes, it is said to be flowing "co-current" with the ambient air stream. As will be appreciated by those skilled in the art, the heat exchanger can more effectively absorb heat from the counter-current motor air than from the co-current motor air. The counter-current air has a higher thermal potential, which causes the counter-current motor air returning to the motor at the intake end of the heat exchanger to be cooler than the co-current return air at the exhaust end. As a result, the motor experiences an undesirable temperature differential between its opposing ends that can substantially limit power output.

Air flow through the interior of conventional air-to-air heat exchanger coolant tubes often cannot be increased sufficiently to eliminate the effect of this temperature differential. Under basic principles of fluid dynamics, the coolant tubes offer resistance to air flow. Increasing the air flow at the intake end of the heat exchanger undesirably creates increased pressure drop without offsetting gains in air flow. The principal solution to the limitations of conventional air-to-air coolers has been to utilize a motor with a higher power output than otherwise needed. The oversized motor is selected to have a sufficiently high rated power output such that, when derated for the adverse operating temperature in the enclosure, its derated power output provides the desired power output. Such a solution undesirably requires a substantially more expensive motor than otherwise needed.

To overcome these and other limitations in the prior art, an improved air cooler for motors is desirable that substantially reduces or eliminates the temperature differential at the ends of the motor. Additionally, an improved heat exchanger coolant tube configuration is desirable that provides increased ambient air flow while minimizing ambient air pressure differentials across the ends of the coolant tubes to achieve more efficient cooling.

SUMMARY OF THE INVENTION

Accordingly, it is an object of the present invention to provide an air cooler with an air-to-air heat exchanger that more effectively cools an enclosed frame motor. A related object is to provide an air cooler that minimizes the temperature differential between the ends of the motor during operation and thereby better enables the motor to operate at its maximum rated power output. A further related object is to provide improved cooling for an enclosed frame motor, whose maximum power output as a result need not be substantially derated, and thereby to enable use of less expensive motors to achieve the desired power output.

It is a further object of the present invention to provide an air-to-air heat exchanger configuration in an air cooler for a motor that utilizes shorter coolant tubes and thereby creates less pressure differential between the ends of the coolant tubes. A further related object is to enable a fan supplying an ambient air stream passing through the heat exchanger to operate more effectively by permitting increased ambient air flow through the heat exchangers without increasing pressure drop.

Another important object of the present invention is to provide an air cooler for a motor that more effectively utilizes twisted coolant tubes and thus provides substantially increased cooling efficiency.

A very important object of the present invention is to provide an improved air cooler for a motor that requires less overhead space for a given pressure drop across the ends of the coolant tubes and thus is better suited for confined spaces.

According to the present invention, the foregoing and other objects are obtained by providing the open side of an enclosed frame motor with an enclosure to form an enclosed region isolating motor air in the enclosed region from ambient air outside the region. Preferably, two air-to-air heat exchangers are disposed in the enclosure above and transverse to the longitudinal axis of the motor drive shaft. Each heat exchanger is coupled with the enclosure to permit a stream of ambient air to flow from outside of the enclosure through the interior of the heat exchanger coolant tubes without contacting the motor air. The heat exchangers are preferably inclined toward one another in an A-shaped configuration. An intake plenum is coupled with one side of the enclosure to better direct the ambient air stream, which is generated by a fan, into the interior of the heat exchanger coolant tubes. An exhaust plenum may also be coupled with a side of the enclosure opposite the intake plenum to further direct the ambient air exiting the coolant tubes.

During operation, heat produced by the motor warms the surrounding motor air. The heated motor air is circulated by an internal fan among the exterior surfaces of the heat exchanger coolant tubes. The heated motor air transfers heat to the tubes thereby producing cooled motor air. The cooled motor air returns to the motor at its ends, thereby cooling the motor. Transversely disposing the heat exchangers and the coolant tubes at opposite ends of the motor permits the returned air to be cooled to substantially the same temperature at each end, thereby greatly reducing the temperature differential in the cooled motor air returning toward the ends of the motor. Additionally, utilizing coolant tubes having a noncircular cross-section can improve effectiveness, especially for use of twisted coolant tubes.

In another embodiment, a plate-type air-to-air heat exchanger may be substituted for one or more of the coolant tube-type heat exchangers for operation in the same manner described above. Alternatively, the two heat exchangers described above could be combined in a single substantially A-shaped heat exchanger module having coolant tubes or plates at opposite ends of the motor extending transversely to the longitudinal axis of the motor.

Additional objects, advantages and novel features of the invention will be set forth in part in the description which follows, and in part will become apparent to those skilled in the art upon an examination of the following, or may be learned by practice of the invention.

BRIEF DESCRIPTION OF THE DRAWING

In the accompanying drawings, which form a part of this specification and which are to be read in conjunction therewith and in which like reference numerals are used to indicate like parts in the various views:

FIG. 1 is a perspective view showing the air cooler of the present invention with parts of the enclosure and the intake plenum being broken away to show particular details of construction.

FIG. 2 is an enlarged side elevation taken along lines 2—2 in FIG. 1 with part of the intake plenum, the enclosure intake sidewall, the motor and the motor frame being broken away to show particular details of construction.

FIG. 3 is a cross-sectional view taken along line 3—3 in FIG. 2 showing the ambient air fan, the intake plenum, a heat exchanger and the exhaust plenum.

FIG. 4 is a cross-sectional view taken along line 4—4 in FIG. 2 with a portion of the heat exchanger coolant tubes being broken away to show particular details of construction.

FIG. 5 is a cross-sectional view taken along line 5—5 of FIG. 2 showing air flow about the motor, and the location of the heat exchanger lower ends in broken lines.

FIG. 6 is a fragmentary cross-sectional view taken along line 6—6 of FIG. 2 showing a portion of the coolant tubes of the heat exchanger and the ambient air and motor air flow relative to the heat exchanger.

FIG. 7 is an enlarged cross-sectional view taken along line 7—7 of FIG. 3 showing a portion of a heat exchanger containing round coolant tubes and the motor air flow relative to the heat exchanger.

FIG. 8 is a cross-sectional view similar to FIG. 7, but containing instead twisted coolant tubes.

FIG. 9 is an enlarged side view of a portion of a twisted coolant tube for a heat exchanger.

FIG. 10 is a cross-sectional view similar to FIGS. 7 and 8, but containing instead a combination of round and twisted coolant tubes.

FIG. 12 is a cross-sectional view similar to FIG. 7, but containing instead coolant tubes having an oblong cross-section.

FIG. 13 is a cross-sectional view similar to FIG. 7, but containing instead coolant tubes having an oval cross-section.

FIG. 14 is a side view of a portion of a finned coolant tube having small diameter fins with some of the fins and the tube outer wall being broken away to show particular details of construction.

FIG. 15 is an enlarged side view of a portion of a finned coolant tube having large diameter fins with some of the fins and the tube outer wall being broken away to show particular details of construction.

FIG. 16 is a fragmentary perspective view of a plate-type air-to-air heat exchanger showing ambient and motor air passages therein.

FIG. 17 is a side elevation similar to FIG. 2 but showing the present invention instead with plate-type air-to-air heat exchangers.

FIG. 18 is a partial cross-sectional view taken along line 18—18 of FIG. 17 showing a portion of the air passages of a plate-type air-to-air heat exchanger and the ambient air flow relative to the heat exchanger.

DETAILED DESCRIPTION OF THE PREFERRED EMBODIMENT

Figure 11:
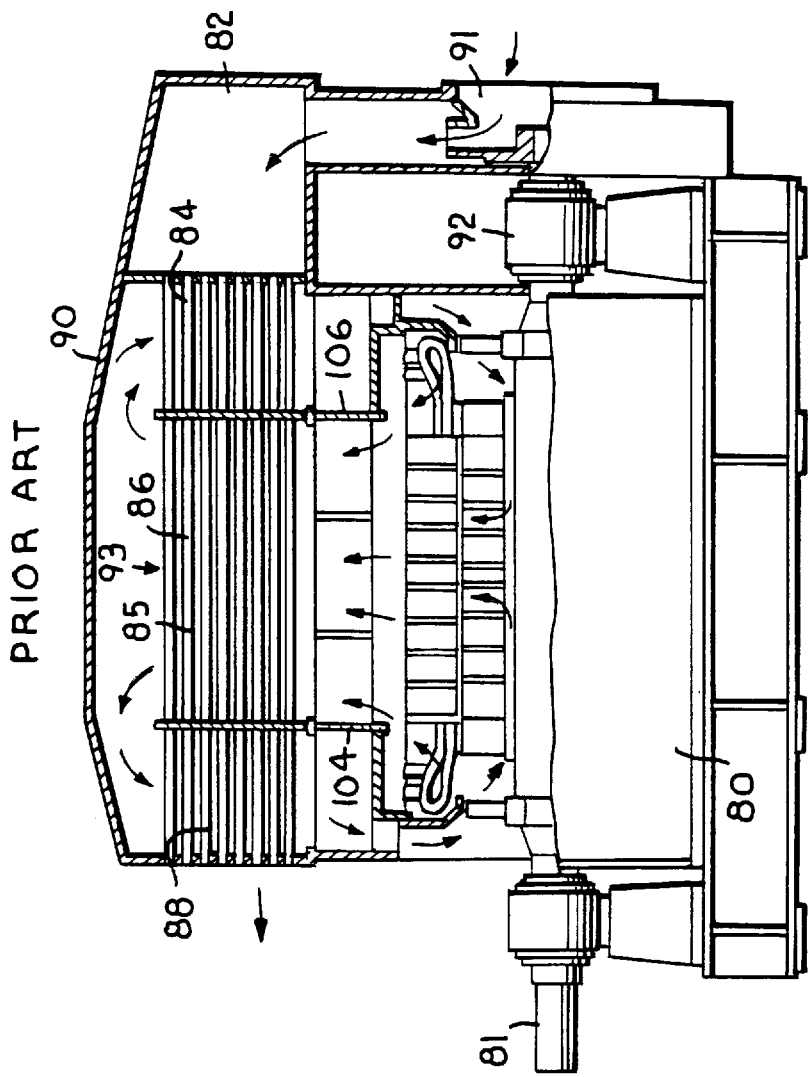
FIG. 11 is a side view of a prior art motor air cooler using an air-to-air heat exchanger with portions of the motor frame and the enclosure being broken away to show particular details of construction.

An air cooler of the present invention is shown in FIGS. 1 and 2 and is designated generally by 94. A motor 100 is shown disposed in an enclosed motor frame 20. An ambient air fan 44 is shown operatively coupled with a motor drive shaft 58. An ambient air intake 56 is disposed proximate fan 44 for communicating ambient air toward fan 44. A power cable 102 is coupled with motor 100 to supply electricity thereto. An enclosure 96 is shown comprised of a top side 51, a front side 52, a rear side 53, an intake sidewall 98 and an exhaust sidewall 64. Sidewalls 64 and 98 extend upwardly to top side 51 and extend from rear side 53 to front side 52. Enclosure 96 is coupled with frame 20 above an opening 22 in frame 20 to form an enclosed region 108 about motor 100 on the interior of enclosure 96 and frame 20. Motor air within enclosed region 108 is isolated from, and not in communication with, ambient air outside thereof. The enclosure can be fabricated from a variety of suitable materials as will be understood by those skilled in the art, including galvanized sheet metal.

Disposed within enclosure 96 is a first air-to-air heat exchanger 24 having a plurality of coolant tubes 28. First heat exchanger 24 is disposed above a first end of motor 100 with coolant tubes 28 extending substantially transverse to the longitudinal axis of drive shaft 58. Also disposed within enclosure 96 is a second air-to-air heat exchanger 26 having a plurality of coolant tubes 34. Second heat exchanger 26 is disposed above a second, opposed end of motor 100 with coolant tubes 34 extending substantially transverse to the longitudinal axis of drive shaft 58. FIG. 5 further illustrates in broken lines the positioning of the lower ends of heat exchangers 24 and 26 relative to motor 100.

As shown in FIG. 2, first heat exchanger 24 preferably has an elongated surface 25, and second heat exchanger 26 preferably has an elongated surface 27. Elongated surfaces 25 and 27 face opposed to one another and may extend upwardly and upright. Alternatively, and preferably, elongated surfaces 25 and 27 extend upwardly and convergently toward one another to form an A-shaped configuration. In this configuration, elongated surfaces 25 and 27 preferably form an angle with and above the horizontal in the range of 40 through 70 degrees to more effectively expose the heated motor air to the heat exchanger without undesirably increasing the height of enclosure 96. A suitable air-to-air heat exchanger is available from a variety of sources, including Unifin International, Inc., London, Ontario, Canada. Alternatively, in another embodiment, the present invention includes the heat exchangers formed as a relatively arcuate or arched configuration.

First heat exchanger 24 and second heat exchanger 26 are coupled with enclosure 96 to permit a stream of ambient air to flow through the interior of the coolant tubes therein without contacting motor air in enclosed region 108. As will be understood by those skilled in the art, heat exchangers 24 and 26 may be coupled with enclosure 96 in a variety of ways. For example, an aperture may be provided each in intake sidewall 98 and in exhaust sidewall 64 to receive opposed ends of first heat exchanger 24 therethrough. Similar apertures may be provided in intake sidewall 98 and in exhaust sidewall 64 to receive opposed ends of second heat exchanger 26 therethrough. To prevent the entry of ambient air into enclosed region 108, the junctures between heat exchangers 24 and 26 and enclosure 96 may be sealed using a gasket, silicone or other methods known to those skilled in the art. Alternatively, intake sidewall 98 and exhaust sidewall 64 could be provided with a plurality of apertures corresponding to the coolant tubes in heat exchangers 24 and 26. Heat exchangers 24 and 26 could then be coupled with enclosure 96 so as to align the coolant tubes therein with the apertures in intake sidewall 98 and exhaust sidewall 64. The junctures between heat exchangers 24 and 26 and enclosure 96 could likewise be sealed as noted above. Heat exchangers 24 and 26 can be secured in place using screws, a friction fit or other methods known to those skilled in the art. Other methods of mounting heat exchangers 24 and 26 in enclosure 96 will be understood by those skilled in the art, and are considered to be within the scope of this invention.

Heat exchangers 24 and 26 are preferably provided with baffles for better directing the flow of motor air. An upper baffle 110 is preferably provided atop heat exchangers 24 and 26 to prevent heated motor air from exiting upwardly through the center of the topmost coolant tubes in heat exchangers 24 and 26, and thus to more efficiently direct the flow of motor air toward motor 100. Lower baffles 48 and 50 similarly assist in directing upwardly circulating heated motor air among the coolant tubes of heat exchangers 24 and 26. Baffles 48, 50 and 1 1 0 can be fabricated from a variety of suitable materials as will be understood by those skilled in the art, such as galvanized sheet metal.

As can be seen in FIGS. 4 and 5, an intake plenum 40 is preferably coupled with enclosure 96 on a first side to permit ambient air to be directed by fan 44 from intake 56 into intake plenum 40 and then into the interior of the coolant tubes of heat exchangers 24 and 26. Fan 44 is preferably disposed proximate intake plenum 40 and may be located in intake plenum 40 with a separate power source. An exhaust plenum 42 is also preferably coupled with enclosure 96 on a second side to permit ambient air exiting the interior of the coolant tubes to be further directed as desired. Exhaust plenum 42 is preferably open on one side, as shown by opening 62, to direct the exhaust ambient air in a desired direction. The intake and exhaust plenums can be fabricated from a variety of suitable materials well-known to those skilled in the art, including galvanized sheet metal. To facilitate moving or hoisting motor 100, plenums 40 and 42 may be removably coupled with enclosure 96 using a nut and bolt, a friction fit or other method known to those skilled in the art. Alternatively, enclosure 96, intake plenum 40 and exhaust plenum 42 may be fabricated as a single unit forming an integral housing for the cooling system. The housing is then adapted to be coupled with frame 20 to form enclosed region 108.

As shown in FIG. 7, the coolant tubes of first heat exchanger 24 and second heat exchanger 26 may include conventional round coolant tubes 70, which have a circular cross-section. Alternatively, as shown in FIG. 8, the coolant tubes may include twisted coolant tubes 72, such as those sold by the Brown Fintube Company in Houston, Texas, which have a noncircular crosssection. A side view of a portion of a twisted coolant tube 74 is shown in FIG. 9. Additionally, as shown in FIG. 10, the coolant tubes may include a combination of round tubes 76 and twisted coolant tubes 78 to achieve desired cooling. Because of the improved air flow characteristics of twisted coolant tubes and because of increased surface area and lower pressure drop associated with such tubes, a substantial increase in efficiency can be achieved by utilizing the present invention with twisted coolant tubes instead of, or in combination with, conventional round coolant tubes. Other types of coolant tubes with a noncircular cross-section may be effectively employed. As shown in FIG. 12, such coolant tubes may include oblong coolant tubes 112 or, as shown in FIG. 13, oval coolant tubes 114. As known to those skilled in the art, heat exchanger coolant tubes may further be furnished with cooling fins to increase heat dissipation capacity. For example, as shown in FIG. 14, a coolant tube 116 may be furnished with cooling fins having a small diameter or, as shown in FIG. 15, a coolant tube 118 may be furnished with large diameter cooling fins. Such finned coolant tubes may be advantageously employed in the heat exchanger of the present invention. Finned coolant tubes may have a circular or noncircular cross-section. Round, oval, oblong or twisted coolant tubes may be provided with cooling fins for improved performance as will be understood by those skilled in the art.

In operation, as shown in the drawings, fan 44 directs an ambient air stream from ambient air intake 56 into intake plenum 40. A first quantity of the ambient air stream flows into the interior of the coolant tubes in heat exchanger 24, and a second quantity of the ambient air stream flows into the interior of the coolant tubes in heat exchanger 26. FIG. 3 illustrates the ambient air stream, shown generally by arrows designated 60, from fan 44 into intake plenum 40, into the interior of the coolant tubes of first heat exchanger 24 and then into exhaust plenum 42. FIG. 6 likewise illustrates a different view of the ambient air stream, shown generally by arrows designated 66, from intake plenum 40 through the interior of the coolant tubes in first heat exchanger 24, into the exhaust plenum 42 and out exhaust port 62. Ambient air flows similarly with respect to heat exchanger 26. Thus, ambient air flows above and substantially transverse to the longitudinal axis of drive shaft 58 at each end of motor 100 without contacting motor air in enclosed region 108.

Air surrounding motor 100 is heated during operation. As shown by dotted line arrows in FIG. 2, the heated motor air is circulated by an internal fan 156 among the exterior surface of coolant tubes in heat exchangers 24 and 26. Lower baffles 48 and 50 may be supplied to better direct and segregate the upward flow of heated motor air. The motor air circulates among the heat exchangers and is cooled to produce cooled motor air. The cooled motor air then circulates downwardly toward the motor to cool the motor and begin the cooling cycle again as shown by dotted line arrows in FIG. 5. The present invention causes the cooled motor air circulated toward the ends of the motor to have a substantially uniform temperature and thereby achieves the important object of reducing the temperature differential between the ends of the motor during operation. In addition, the transverse orientation of the coolant tubes allows the tubes to be relatively short as compared to the tubes used in the prior art heat exchangers. The shorter tube length results in a decreased pressure differential at the ends of the tubes.

FIG. 17 shows an air cooler embodying the principles of the present invention that is essentially identical to the embodiment shown in FIG. 2 except that plate-type air-to-air heat exchangers are substituted in place of coolant tube-type heat exchangers. The plate-type air-to-air heat exchanger is well known to those skilled in the art. Such a heat exchanger is formed generally, as shown in FIG. 16 and as known to those skilled in the art, of alternating layers of ambient air passages 146 and motor air passages 142. Air flowing in ambient air passages 146 does not contact motor air flowing in motor air passages 142. Passages 142 and 146 are formed from plates that extend the length or width of the plate-type heat exchanger. In this embodiment, an enclosure 158 has a front side 124 corresponding to enclosure front side 52 and is coupled with the motor frame in the manner previously discussed and shown in FIG. 2. Disposed within enclosure 158 is a first plate-type air-to-air heat exchanger 128 having a plurality of ambient air passages 143. First heat exchanger 128 is disposed above a first end of the motor with ambient air passages 143 extending substantially transverse to the longitudinal axis of the motor drive shaft. Also disposed within enclosure 158 is a second plate-type air-to-air heat exchanger 132 having a plurality of ambient air passages 147. Second heat exchanger 132 is disposed above a second, opposed end of the motor with ambient air passages 147 extending substantially transverse to the longitudinal axis of the motor drive shaft.

First heat exchanger 128 preferably has an elongated surface 130, and second heat exchanger 132 preferably has an elongated surface 134. Elongated surfaces 130 and 134 face opposed to one another and may extend upwardly and upright. Alternatively, and preferably, elongated surfaces 130 and 134 extend upwardly and convergently toward one another to form an A-shaped configuration as previously described for coolant tube-type heat exchangers.

First heat exchanger 128 and second heat exchanger 132 are coupled with enclosure 158, intake sidewall 122 and exhaust sidewall 150 to permit a stream of ambient air to flow through the interior of the proximately disposed ambient air passages therein without contacting motor air. Heat exchangers 128 and 132 may be coupled with enclosure 158 in the manner explained above for heat exchangers 24 and 26. As discussed above for baffles 48 and 50, lower baffles 136 and 138 are provided for better directing the flow of motor air. An upper baffle 140 is preferably provided atop heat exchangers 128 and 132 to prevent heated motor air from exiting upwardly above heat exchangers 128 and 132. An intake plenum 120 and an exhaust plenum can be coupled with enclosure 158 in the manner discussed above and shown in FIGS. 1, 2 and 3.

The operation of this embodiment is as described above for coolant tube-type heat exchangers. Heated motor air is circulated upwardly as shown by arrows in FIG. 17. The heated motor air passes through motor air passages 142 and 144 and transfers heat to the ambient air flowing respectively in ambient air passages 143 and 147. As shown in FIG. 18, an ambient air stream 152 enters intake plenum 120 and travels through ambient air passages 126 and into exhaust plenum 148. Motor air circulates through motor air passages 160 and is cooled to produce cooled motor air that is returned to the motor as discussed above.

In yet a further embodiment (not depicted in the drawings), a single heat exchanger module having ambient air and motor passages at both ends of the motor could be employed. Heat exchangers 24 and 26 could be manufactured as a single, integral unit. Likewise, heat exchangers 128 and 132 could be manufactured as a single, integral unit. In this regard, it is within the scope of the present invention that the previously discussed configuration of two heat exchangers includes a single integral heat exchanger module having ambient air and motor air passages at both ends of the motor. In this embodiment, the ambient air passages are disposed above the motor substantially transverse to the longitudinal axis of the drive shaft. Furthermore, it is contemplated that references to heat exchanger air "passages" include heat exchanger coolant tubes, plate-type heat exchanger passages and similar arrangements for directing air flow. Such an integral unit can be of a substantially A-shaped configuration, and could also include a relatively arcuate or ached configuration.

By contrast, a prior art air cooler for a motor using an air-to-air heat exchanger is shown in FIG. 11. As shown therein, an air-to-air heat exchanger, designated generally as 93, is disposed in an enclosure 90, which isolates motor air about a motor 80 from ambient air. The heat exchanger coolant tubes 85 are disposed above motor 80 substantially parallel to the longitudinal axis of the motor drive shaft 81. An ambient air intake plenum 82 is coupled with enclosure 90 to direct ambient air from an ambient air intake 91 into the interior of coolant tubes 85. A fan 92 is disposed proximate plenum 82 to generate a stream of ambient air.

In operation, fan 92 of the prior art cooler directs ambient air from ambient air intake 91 into plenum 82 and then through the interior of coolant tubes 85 as shown by the arrows indicating ambient air flow. Motor air heated during operation of motor 80 is circulated by an internal fan from the middle portion of motor 80 through the midsection 86 of coolant tubes 85 as directed by baffles 104 and 106. When the heated motor air passes among the midsection of the coolant tubes 86 of heat exchanger 93, heat is transferred to the midsection of the coolant tubes 86 and then transferred to the ambient air flowing therein. As shown by the motor air flow arrows, the motor air then circulates toward either the intake end section of the coolant tubes 84 or the exhaust end section of the coolant tubes 88. The motor air then descends among the respective coolant tube sections 84 and 88. The thereby cooled motor air returns toward motor 80 to cool motor 80 and thereby to restart the cooling cycle.

As discussed above, the motor air current circulating among the intake end section of the coolant tubes 84 is generally cooler upon return to motor 80 than the motor air circulating among exhaust end section of the coolant tubes 88. This prior art cooler frequently creates a temperature differential on the ends of motor 80 that undesirably limits power output and thereby requires more expensive motors than otherwise necessary to achieve a desired power output.

The present invention provides a novel air cooler for an enclosed frame motor producing increased cooling efficiency over prior art air-to-air cooling systems. By disposing heat exchangers above each end of the motor and orienting the ambient air passages or coolant tubes transverse to the longitudinal axis of the drive shaft, the present invention greatly reduces the temperature differential of the cooled motor air returned toward the ends of the motor. This in turn eliminates the need to utilize oversized, but temperature-derated, motors that are more expensive than otherwise needed. The unique, transverse A-shaped heat exchanger configuration of the present invention further serves to increase efficiency by providing increased cooling surface area and, thus, increased heat exchange interaction between the heated motor air and the heat exchanger coolant tubes or plates. In addition, inclining the heat exchangers toward one another produces an efficient motor cooling system that requires less overhead space. Additionally, by substantially increasing the number of heat exchanger coolant tubes or plates for absorbing heat from the motor air and by reducing the length of the coolant tubes or passages due to the transverse orientation of the tubes or passages with respect to the drive shaft, the present invention offers increased cooling capacity without undesirable pressure differentials at the external ends of the coolant tubes. The increased number of tubes or plates and reduced pressure drop enables existing fan designs to perform more effectively, wherein more of the power consumed by the fan results in increased ambient air flow rather than contributes to pressure differentials across the ends of the tubes. Even further enhanced performance can be obtained from the present invention by using twisted coolant tubes.

From the foregoing, it will be seen that this invention is one well-adapted to obtain all the ends and objects herein above said forth together with other advantages which are obvious and which are inherent to the structure. It will be understood that certain features and subcombinations are of utility and may be employed without reference to other features and subcombinations. For example, more than two air-to-air heat exchangers could be utilized. Additionally, the present invention could be employed to cool motors powered other than by electricity. Moreover, the invention includes a coolant tube heat exchanger and a plate-type heat exchanger used in combination. Such alternatives are contemplated by and within the scope of the claims. Since many possible embodiments may be made of the invention without departing from the scope thereof, it is to be understood that all matter here and set forth are shown in the accompanying drawings is to be interpreted as illustrative and not in a limiting sense.

We claim:

1. An apparatus for cooling an enclosed-frame motor in which a frame prevents the motor air flowing within the frame from mixing with ambient air outside the frame, the motor including a pair of longitudinally spaced end regions and a central region intermediate the end regions, the apparatus comprising:

an enclosure presenting a pair of longitudinally spaced end sections, a central section intermediate the end sections, an inlet opening providing communication between the central region of the motor and the central section of the enclosure, and outlet openings providing communication between the end sections of the enclosure and the end regions of the motor;

a cross-flow heat exchanger separating the central section of the enclosure from the end sections so that motor air passes into the central section of the enclosure, across the heat exchanger, and through the end sections to the end regions of the motor, the cross-flow heat exchanger including a plurality of air passages extending in a direction substantially transverse to the path of motor air through the enclosure, the air passages each presenting an inlet opening and an outlet opening;

an intake plenum in fluid communication with the inlet openings of the air passages of the heat exchanger, the intake plenum including an inlet opening; and a fan for supplying ambient air under pressure to the inlet opening of the intake plenum.

2. An apparatus as recited in claim 1, wherein the air passages include tubes.

3. An apparatus as recited in claim 2, wherein the tubes each include a circular cross-sectional shape.

4. An apparatus as recited in claim 2, wherein the tubes each include an oblong cross-sectional shape.

5. An apparatus as recited in claim 2, wherein the tubes each include an oval cross-sectional shape.

6. An apparatus as recited in claim 2, wherein some of the tubes include a circular cross-sectional shape and others of the tubes include a non-circular cross-sectional shape.

7. An apparatus as recited in claim 2, wherein the tubes each define a longitudinal axis along which the tube is twisted to present a non-circular shape that varies along the length of the tube.

8. An apparatus as recited in claim 2, wherein each tube includes an outer surface and fins protruding radially from the outer surface.

9. An apparatus as recited in claim 1, wherein the heat exchanger is A-shaped, presenting two heat exchanger units separating the central section of the enclosure from the end sections.

10. An apparatus as recited in claim 1, wherein the air passages are defined by a plurality of stacked plates.

11. An apparatus as recited in claim 1, further comprising an exhaust plenum in fluid communication with the outlet openings of the air passages of the heat exchanger, the exhaust plenum including an outlet opening from which ambient air is delivered from the heat exchanger.

12. An apparatus as recited in claim 1, wherein the fan is connected to and driven by the motor such that ambient air is forced through the heat exchanger during operation of the motor to cool the motor air.

* * * * *